Nov. 21, 1961 S. H. SCHWARTZ 3,009,482
VACUUM CONTROL VALVE
Filed July 23, 1958
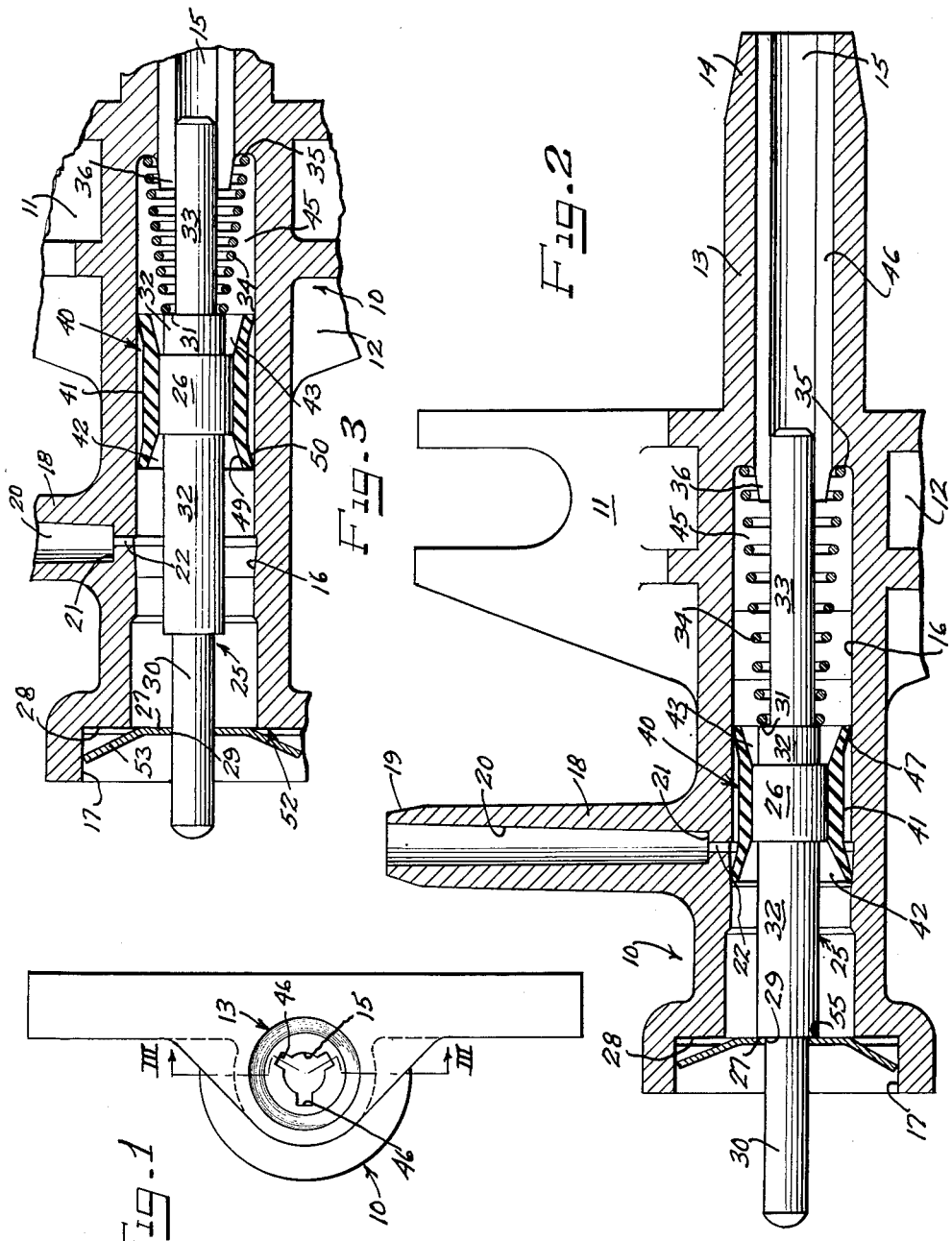
Inventor
Samuel H. Schwartz United States Patent Office 3,009,482
Patented Nov. 21, 1961

3,009,482
VACUUM CONTROL VALVE
Samuel H. Schwartz, Deerfield, Ill., assignor to The Dole Valve Company, Morton Grove, Ill., a corporation of Illinois
Filed July 23, 1958, Ser. No. 750,347
2 Claims. (Cl. 137—625.25)

This invention relates to flow control valves and more particularly relates to negative pressure or vacuum control valves arranged to control the operation of pneumatically actuated devices.

It is well known in the art that many devices such as, for instance, vehicle heaters may be controlled pneumatically by positive pressure or by vacuum.

Applicant's valve is designed to control the pneumatic actuation of such devices and cooperates therewith in such a novel way that a brief description of such a device is given hereafter.

Vehicle heaters have generally been arranged to receive their heat from the fluid flowing through the water jacket of the vehicle engine and have been arranged to receive a flow of air from a collection conduit leading from a collection point of the front end of the vehicle. A second conduit then generally leads from the heater to the interior of the vehicle to supply a flow of hot air from the collection conduit to the interior of the vehicle. In order to shut off the supply of hot air to the interior of the vehicle a by-pass vent conduit is generally provided to by-pass the heater and a flutter damper is provided within the collection conduit downstream of the junction between the collection and by-pass conduits to provide a means for preventing the passage of air to the heater and thence to the interior of the vehicle.

Since, however, it has been found that heat invariably passes from the heater, which is continuously supplied with hot water, to the interior of the vehicle even though the flutter damper is closed, it has been found to be advantageous to provide a means for shutting off the flow of hot water to the heater simultaneously, or substantially so, with the closing of the flutter damper. Vacuum controlled shutoff valves have been used to accomplish this function.

Applicant's device, as disclosed herein, is a negative pressure or vacuum control valve which is arranged to actuate a pneumatically actuatable device such as the vacuum control shutoff valve mentioned above. It comprises a valve body having a bore formed axially therein and a connecting nipple formed at one end of the valve body which has a hollow passageway therethrough communicable with one end of the bore which is arranged to be connected to a vacuum pump or the like. The opposite end of the bore is communicable with the atmosphere. A second connecting nipple is formed within a side of the valve body and opens through a port to the bore within the valve body. This second connecting nipple is arranged to be connected to suitable hoses or the like which, in turn, are connected to the pneumatically actuatable device such as the above mentioned shutoff valve.

A valve member is disposed within the bore and is slidably positioned therein so that the second connecting nipple can be selectively communicated with either the end of the bore open to the atmosphere or, in the alternative, to the opposite end of the bore which is connected to the vacuum pump. However, in applicant's control valve the reciprocable valve member has a check valve formed integrally therewith so that a separate check valve in the lines leading from the control valve to the pneumatically actuatable device is unnecessary. In this manner, if a pneumatically actuatable device such as a shutoff valve associated with a vehicle heater is being actuated by a vacuum pump through a control valve of the type herein described a failure of the vacuum source for any reason will not result in the deactuation of the shutoff valve.

Accordingly, it is a principal object of this invention to provide a combination control valve and check valve for controlling the pneumatic actuation of a pneumatically operable device.

Another object of the present invention is to provide a pneumatic control valve having an inlet and an outlet and a control valve and check valve interposed therebetween to control fluid flow between said inlet and said outlet.

A still further object of the present invention is to provide a pneumatic control valve having a controlling valve member therein which the valve member has a check valve formed integrally therewith.

These and other objects of the invention will become apparent from time to time as the following specification proceeds and with reference to the accompanying drawings wherein;

FIGURE 1 is a front elevational view of a control valve constructed in accordance with the principles of the present invention;

FIGURE 2 is a vertical sectional view through the control valve illustrated in FIGURE 1 showing the controlling valve member in one position; and FIGURE 3 is a vertical sectional view through the control valve illustrated in FIGURE 1 and showing the controlling valve member in a different position from that shown in FIGURE 2.

In the embodiment of the invention illustrated in the drawing there is shown a valve body 10 having integrally formed mounting legs 11 and 12, respectively, extending from opposite sides thereof which provide a suitable means for mounting the control valve in any desired position.

A hollow outwardly extending boss or connecting nipple 13 is formed integrally with the valve body 10 and has a tapered outer end portion 14 and is adapted to be connected through suitable hoses or tubing to a pressure reducing source such as a vacuum pump.

A cylindrical passageway 15 is formed within the nipple 13 and opens to a bore 16 which is formed axially within the valve body 10. The bore 16 similarly, opens to a radially enlarged counterbore 17 which is formed at one end of the valve body 10.

A second hollow boss or connecting nipple 18 extends outwardly from a side of the valve body 10 and is formed integrally therewith and, like the nipple 13, has a tapered outer end portion 19 and is adapted to be connected through suitable hoses or tubing to a pneumatically actuatable device. A substantially cylindrical passageway 20 extends axially through the boss 18 and terminates in a shoulder 21 adjacent the base of the nipple 18. A port 22 is formed coaxially with the passage 20 and communicates the passage 20 with the bore 16.

A control rod 25 having a circumferentially enlarged central connecting portion 26 for reasons which will hereinafter become apparent is slidably positioned within the cylindrical passageway 15 and extends through the bore 16 through the outer open end of the valve body 10. A spider 27 is seated on the annular shoulder 28 formed intermediate the counterbore 17 and the bore 16 and is centrally apertured as at 29 to slidably receive the radially reduced outer end portion 30 of the control rod 25.

A shoulder 31 is formed intermediate a radially enlarged central portion of the control rod 25 and the radially reduced inner end portion 33 thereof and serves to provide a seat for a conically shaped compression spring 34 which is seated, at its other end portion, on the end wall 35 of the bore 16 about an inwardly extending cylindrical guide portion 36 of the valve body 10 which defines the passageway 15.

The valve member 40, which forms the subject of the present invention, is constructed somewhat in the form of a hyperboloid and has a central cylindrical portion 41 intermediate a pair of opposed integrally formed annular skirts 42 and 43. The hollow centrally located cylindrically shaped interior of the valve member 40 is arranged to snugly fit on the circumferentially enlarged portion 26 of the control rod 25 and frictionally engages the same so that axial movement of the control rod 25 within the bore 16 will move the valve member along the inner wall of the bore 16 for reasons which will hereinafter become apparent.

It will thus become apparent that if the connecting nipple 13 is suitably connected to a low pressure source such as a vacuum pump as has been hereinbefore described the operation of the control valve will be as follows: when the valve parts are in the position illustrated in FIGURE 2 a negative pressure region will be produced within the inner end 45 of the bore 16 due to the suction of the vacuum pump to withdraw air from the inner end 45 at the bore 16 through slots 46 formed about the passageway 15, through the passageway 15 to the vacuum pump.

Thus, atmospheric pressure acting on the outer surface 47 of the skirt 43 will force the annular wall of the skirt 43 radially inwardly to thereby withdraw air from the passageway 20 through the port 22, the inner end 45 of the bore 16, the slots 46, and the passageway 15 to the vacuum pump. Thus, when the valve member 40 is in the position illustrated in FIGURE 2 and a negative pressure or vacuum source is connected to the nipple 13 air will be withdrawn from the passage 20. In this manner, a pneumatically operable device connected to the nipple 18 will be actuated.

Referring now more particularly to FIGURE 3 of the drawings it will be noted that depression of the control rod 25 against the biasing force of spring member 34 will move the valve member 40 including the skirt 42 toward the inner end 45 of the bore 16 past the port 22. Thus, although a vacuum source be connected to the nipple 13 there will be no withdrawal of air from the passage 20 since the atmospheric pressure acting on the inner surface 49 of the skirt 42 against the low pressure area on the outer surface 50 thereof will force the skirt 42 radially outwardly into sealing engagement with the inner wall of the bore 16.

To insure a tight seal between the skirt 42 and the inner wall of the bore 16 when the valve member 40 is in the position illustrated in FIGURE 3 the bore 16 is so formed that the diameter thereof intermediate the port 22 and the end wall 35 is somewhat smaller than the diameter of the bore intermediate the port 22 and the outer end of the valve body 10.

Thus, when the control rod 25 is depressed and the valve member 40 is in the position illustrated in FIGURE 3 the passage 20 will be communicated with the atmosphere through the port 22 and the aperture 29 and through vents 52 formed by a plurality of upturned nibs 53.

The release of pressure from the outer end of the control rod 55 will cause the control rod to again be moved to the position illustrated in FIGURE 2 by the biasing force of spring member 34 until the shoulder 55 intermediate the radially reduced outer end portion 30 and the radially enlarged portion 32 of the control rod 25 abuts the inner surface of the spider 27.

It will be understood that if for any reason there is a failure of the negative pressure or a vacuum source connected to the nipple 13 and if the valve member 40 is in the position illustrated in FIGURE 2 the annular skirt 43 will return to its normal position in juxtaposition to the inner wall of the bore 16 and will be maintained in engagement therewith due to the pressure differential on opposite surfaces of the skirt 43 so that the pneumatically actuatable device connected to the nipple 18 will not be made inoperative.

Accordingly, applicant has provided a pneumatic control valve in which the controlling valve member also has a check valve formed integrally therewith on either end thereof so that failure of the low pressure or vacuum source will not cause immediate deactuation of the pneumatically actuatable device connected therewith such as the vehicle heater described herein.

It will herein be understood that this embodiment of the invention has been used for illustrative purposes only and that various modifications and variations in the present invention may be effected without departing from the spirit and scope of the novel concepts thereof.

I claimed as my invention:

1. A fluid control valve comprising a housing having a bore formed therein, vent and outlet ports opening respectively to opposite ends of said bore, a control port opening to said bore intermediate said ports, a valve member positioned within said bore having a center section spaced from the wall of said bore and having oppositely facing resilient flared skirts engageable with the wall of said bore and extending from opposite ends of said center section, wherein said skirts comprise the only portions of said valve member contacting the wall of said bore, means for positioning said valve member with said center section overlying said control port to cover said control port, and means for moving said valve member within said bore in the direction of said outlet port to uncover said control port.

2. A fluid control valve comprising a housing having a bore formed therein, vent and outlet ports opening respectively to opposite ends of said bore, a control port opening to said bore intermediate said ports, a valve rod extending into said bore, a valve member positioned within said bore having a center section bonded to a portion of said rod and spaced from the wall of said bore, oppositely facing resilient flared skirts formed integrally with said center section and engageable with the wall of said bore and extending from opposite ends of said center section, wherein said skirts comprise the only portions of said valve member contacting the wall of said bore, means for positioning said valve member with said center section overlying said control port to cover said control port, wherein movement of said rod and valve member in the direction of said outlet port will uncover said control port.

References Cited in the file of this patent
UNITED STATES PATENTS

| | | |
|---|---|---|
| 1,211,040 | Baird | Jan. 2, 1917 |
| 1,357,840 | Brooks | Nov. 2, 1920 |
| 2,388,560 | Mead | Nov. 6, 1945 |

FOREIGN PATENTS

| | | |
|---|---|---|
| 532,429 | Belgium | of 1954 |